(12) United States Patent
Cho et al.

(10) Patent No.: US 11,836,093 B2
(45) Date of Patent: Dec. 5, 2023

(54) METHOD AND APPARATUS FOR TTL-BASED CACHE MANAGEMENT USING REINFORCEMENT LEARNING

(71) Applicant: ELECTRONICS AND TELECOMMUNICATIONS RESEARCH INSTITUTE, Daejeon (KR)

(72) Inventors: Chunglae Cho, Daejeon (KR); Seungjae Shin, Sejong-si (KR); Seung Hyun Yoon, Daejeon (KR); Hong Seok Jeon, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 121 days.

(21) Appl. No.: 17/557,807

(22) Filed: Dec. 21, 2021

(65) Prior Publication Data

US 2022/0197823 A1     Jun. 23, 2022

(30) Foreign Application Priority Data

Dec. 21, 2020 (KR) .................. 10-2020-0180254

(51) Int. Cl.
*G06F 12/12* (2016.01)
*G06F 12/128* (2016.01)
*G06F 12/0871* (2016.01)
*H04L 67/5682* (2022.01)
*G06F 18/21* (2023.01)

(52) U.S. Cl.
CPC ........ *G06F 12/128* (2013.01); *G06F 12/0871* (2013.01); *G06F 18/217* (2023.01); *H04L 67/5682* (2022.05); *G06F 2212/1021* (2013.01)

(58) Field of Classification Search
CPC ............... G06F 12/128; G06F 12/0871; G06F 2212/1021
See application file for complete search history.

(56) References Cited

U.S. PATENT DOCUMENTS

| 9,954,941 | B2 | 4/2018 | Kim et al. |
| 2014/0019543 | A1 | 1/2014 | Hyun et al. |
| 2014/0208020 | A1* | 7/2014 | Benhase ............. G06F 12/0802 711/119 |
| 2017/0052976 | A1 | 2/2017 | Verma et al. |
| 2019/0281129 | A1 | 9/2019 | Menai et al. |
| 2020/0007409 | A1 | 1/2020 | Kim et al. |

FOREIGN PATENT DOCUMENTS

| CN | 111970733 A | 11/2020 |
| KR | 10-2016-0046667 A | 4/2016 |
| KR | 10-1825841 B1 | 2/2018 |
| KR | 10-1924165 B1 | 12/2018 |

* cited by examiner

*Primary Examiner* — Jae U Yu
(74) *Attorney, Agent, or Firm* — Rabin & Berdo, P.C.

(57) ABSTRACT a method and an apparatus for managing a cache for storing content by determining popularity of the content based on content requests received during a current time slot for the content; transmitting information about the popularity of the content to a time-to-live (TTL) controller and receiving, from the TTL controller, TTL values for each popularity level determined by the TTL controller based on the information about the popularity; and managing the content based on the TTL values for each popularity level are provided.

11 Claims, 11 Drawing Sheets

METHOD AND APPARATUS FOR TTL-BASED CACHE MANAGEMENT USING REINFORCEMENT LEARNING

CROSS-REFERENCE TO RELATED APPLICATION

This application claims priority to and the benefit of Korean Patent Application No. 10-2020-0180254 filed in the Korean Intellectual Property Office on Dec. 21, 2020, the entire contents of which are incorporated herein by reference.

BACKGROUND OF THE INVENTION

(a) Field of the Invention

This description relates to a method and an apparatus for TTL-based cache management using reinforcement learning.

(b) Description of the Related Art

Due to the explosive increase in video traffic, the appearance of new services such as augmented reality (AR)/virtual reality (VR), and the spread of online social network services, the characteristics of demand for contents provided through the Internet are rapidly changing. Users consume new contents such as 4K, QHD, and 360-degree images through the Internet, and various formats of contents are required according to the characteristics of the terminal and network environment. For example, the AR and VR services require stricter bandwidth and delay time. The online social networking services further increase the volatility of content popularity, causing unpredictable spatial and temporal traffic explosions.

The above information disclosed in this Background section is only for enhancement of understanding of the background of the invention, and therefore it may contain information that does not form the prior art that is already known in this country to a person of ordinary skill in the art.

SUMMARY OF THE INVENTION

An embodiment provides a method for managing a cache for storing content.

Another embodiment provides a TTL controller determining a time-to-live (TTL) value for managing contents stored in a cache Yet another embodiment provides an apparatus for managing a cache for storing content.

According to an embodiment, a method for managing a cache for storing content is provided. The method includes: determining popularity of the content based on content requests received during a current time slot for the content; transmitting information about the popularity of the content to a time-to-live (TTL) controller and receiving, from the TTL controller, TTL values for each popularity level determined by the TTL controller based on the information about the popularity; and managing the content based on the TTL values for each popularity level.

The managing the content based on the TTL values for each popularity level may include: determining a TTL value of the content using a TTL table for each popularity level consisting of the TTL values for each popularity level; and determining whether to store the content in cache storage by comparing the TTL value of the content with TTL values of pre-stored contents in the cache storage.

The determining whether to store the content in cache storage by comparing the TTL value of the content with TTL values of pre-stored contents in the cache storage may include deleting content with a minimum TTL value from the cache storage and checking an empty space for the content in the cache storage, when the TTL value of the content is greater than the minimum TTL value among the TTL values of the pre-stored contents.

The determining whether to store the content in cache storage by comparing the TTL value of the content with TTL values of pre-stored contents in the cache storage may include terminating cache storage management for the content without storing the content in the cache storage when the TTL value of the content is equal to or less than a minimum TTL value among the TTL values of the pre-stored contents.

According to another embodiment, a TTL controller determining a time-to-live (TTL) value for managing contents stored in a cache is provided. The TTL controller includes: a system state encoder configured to receive information about popularity of contents in a previous time slot and generate a system state vector based on the information about the popularity; a reward encoder configured to receive cache hit rate for contents in a current time slot and generate a reward value based on the cache hit rate; a reinforcement learning agent configured to perform reinforcement learning by receiving the system state vector and the reward value; and an action decoder configured to output TTL values for each popularity level of the current time slot based on an action vector generated from a result of the reinforcement learning performed by the reinforcement learning agent.

The reinforcement learning agent may be configured to further perform the reinforcement learning to increase a sum of utility of the cache hit rate, and the cache hit rate may be a ratio of a total number of request messages for a specific content and response messages transferred when the specific content is responded from the cache.

The reinforcement learning agent may be configured to further perform the reinforcement learning to increase a sum of utility of the cache hit rate expressed by a linear function, and the action decoder may be configured to further output TTL values for each popularity level that maximize cache throughput of the cache.

The reinforcement learning agent may be configured to further perform the reinforcement learning to increase a sum of utility of the cache hit rate expressed by a log function, and the action decoder may be configured to further output TTL values for each popularity level that maximize proportional fairness of the content.

The action decoder may be configured to generate TTL weight values for each popularity level from an action vector received from the reinforcement learning agent and determine the TTL values for each popularity level as a sum of the TTL weight values for each popularity level.

The system state encoder may be configured to sum popularities of the contents measured during the previous time slot for each M content group according to sizes of the popularities and generate popularity information for each content group as the system state vector.

According to yet another embodiment, an apparatus for cache management of a cache for storing contents is provided. The apparatus includes a processor, a memory, and a communication device, wherein the processor executes a program stored in the memory to perform: determining popularity of the content based on content requests received through the communication device during a current time slot for the content; transmitting information about the popularity of the content to a time-to-live (TTL) controller through the communication device and receiving, from the TTL controller through the communication device, TTL values for each popularity level determined by the TTL controller based on the information about the popularity; and managing the content based on the TTL values for each popularity level.

DETAILED DESCRIPTION OF THE EMBODIMENTS

Figure 1:
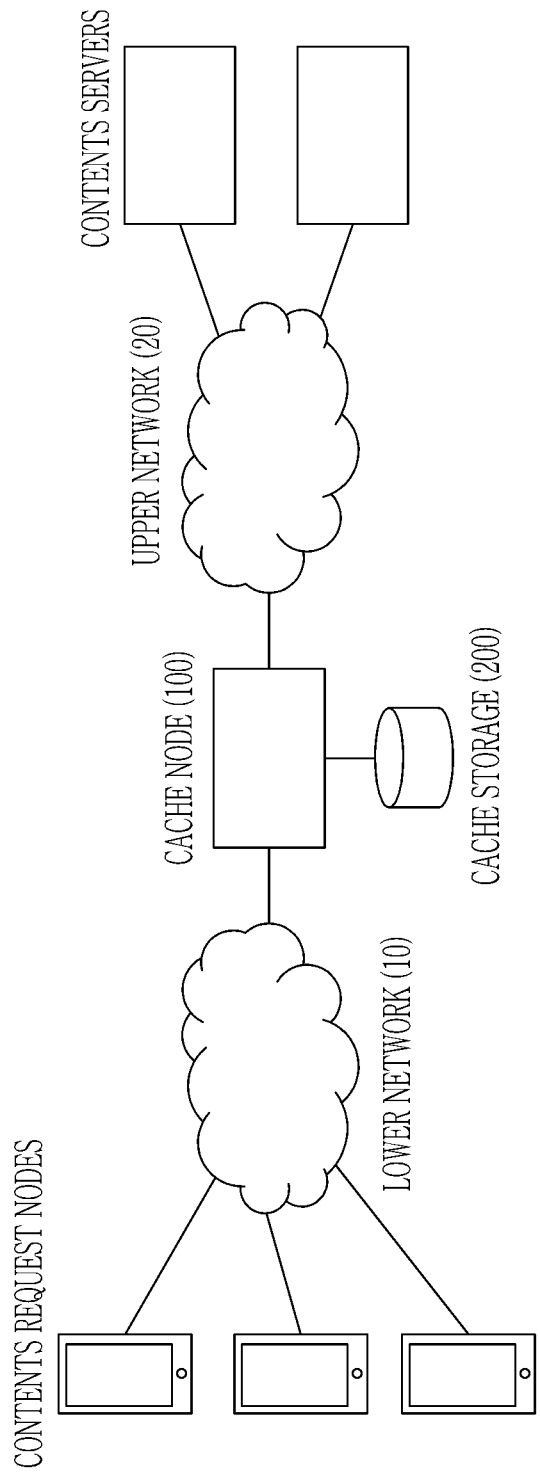
FIG. 1 is a schematic diagram illustrating a content cache network according to an embodiment.

In the following detailed description, only certain embodiments have been shown and described, simply by way of illustration. As those skilled in the art would realize, the described embodiments may be modified in various different ways, all without departing from the spirit or scope of the description. Accordingly, the drawings and description are to be regarded as illustrative in nature and not restrictive, and like reference numerals designate like elements throughout the specification.

Throughout the specification, unless explicitly described to the contrary, the word "comprise", and variations such as "comprises" or "comprising", will be understood to imply the inclusion of stated elements but not the exclusion of any other elements.

In this specification, expressions described in the singular may be construed in the singular or plural unless an explicit expression such as "one" or "single" is used.

As used herein, "and/or" includes each and every combination of one or more of the recited elements.

In the specification, it will be understood that, although the terms "first," "second," etc. may be used herein to describe various elements, these elements should not be limited by these terms. These terms are only used to distinguish one element from another. For example, a first element could be termed a second element, and a second element could similarly be termed a first element without departing from the scope of the present description.

In a flowchart described with reference to drawings in this specification, the order of operations may be changed, several operations may be merged, some operations may be divided, and specific operations may not be performed.

Figure 2:
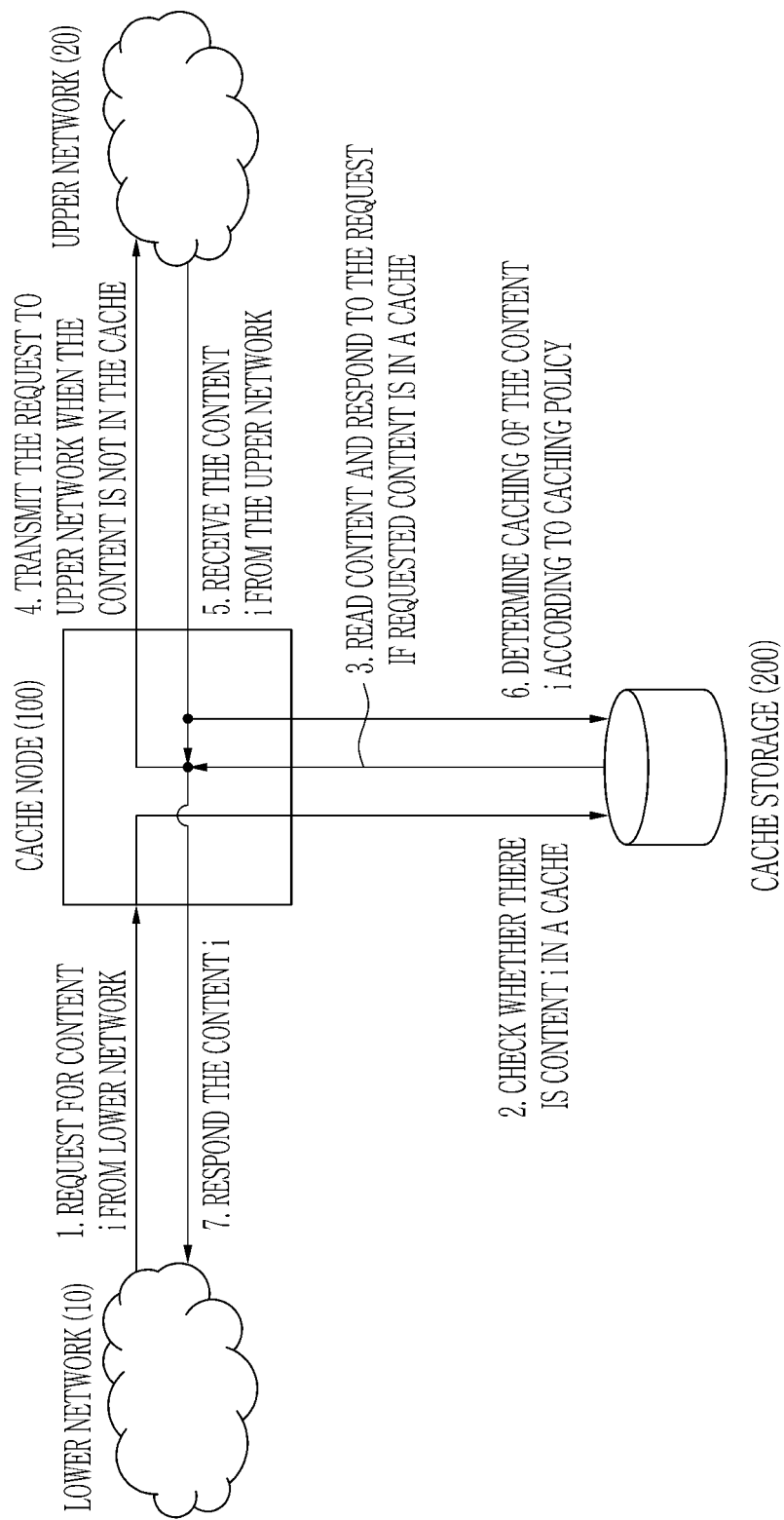
FIG. 2 is a schematic diagram illustrating an operation process of a cache node according to an embodiment.

FIG. 1 is a schematic diagram illustrating a content cache network according to an embodiment, FIG. 2 is a schematic diagram illustrating an operation process of a cache node according to an embodiment.

Referring to FIG. 1, a content cache network according to an embodiment may include content servers, cache node 100, and content request nodes. A content request node may be a node that requests content to the network, receives the content from the network, and consumes the received content.

The content servers may store contents and provide the requested content when it receives a request for the content.

The cache node 100 may be connected to the content request node through a lower network 10 and connected to the content server through an upper network 20. The cache node 100 may store some of the contents in the cache storage 200 connected to the cache node 100. Another cache nodes 100 may exist in the lower network 10 and the upper network 20 as well.

The cache node 100 that has received the request for specific content from the content request node may return the requested content to the content request node when there is the requested content in the cache storage 200. Since the cache node 100 directly transmits the response to the content request of the content request node, the time for the content request node to receive the content can be reduced and the load on the upper network 20 and content server can also be reduced simultaneously.

Referring to FIG. 2, the cache node 100 may receive a request message for the specific content from the lower network 10 and check whether the requested content is stored in the cache storage 200.

When there is requested content in the cache storage 200, the cache node 100 may read the requested content from the cache storage 200 and send a response message containing the requested content to the content request node through the lower network 10.

When the requested content is not in the cache storage 200, the cache node 100 may deliver the content request message to another cache node or content server through the upper network 20. Upon receiving the content response message through the upper network 20, the cache node 100 may determine whether to caching the content received through the content response message according to the caching policy.

Here, the caching policy may be used to determine whether to store a certain content in the cache storage 200. Since the cache storage 200 has a limited size, only some of the entire contents can be stored. If the received content is determined to be stored according to the caching policy but there is no empty space in the cache storage 200, the cache node 100 may delete the content with low priority among the contents stored in the cache storage 200 according to the caching policy and store the newly received content. If the priority of the newly received content is lower than or the same as the priority of the content stored in the cache storage 200, the cache node 100 may not store the newly received content.

Then, the cache management device 110 of the cache node 100 according to an embodiment may determine popularity of the content based on the number of requests for the content and a TTL controller 120 may determine a time-to-live (TTL) value by performing reinforcement learning using information about the popularity of the content.

Figure 3:
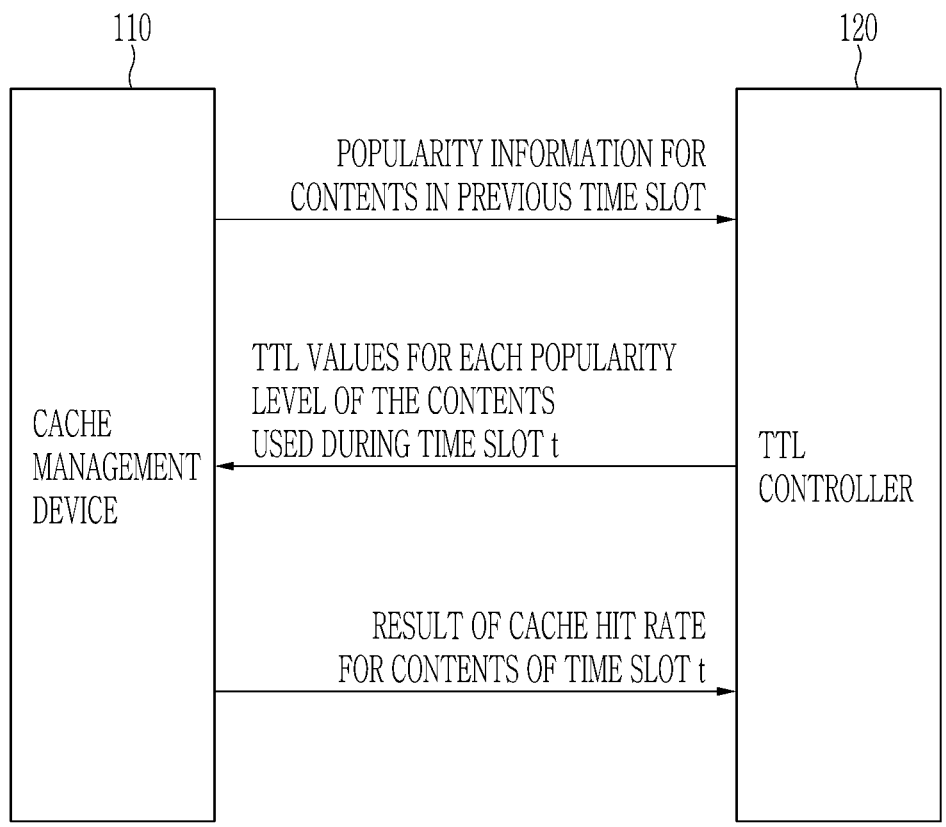
FIG. 3 is a schematic diagram illustrating a method for cache management according to an embodiment.

FIG. 3 is a schematic diagram illustrating a method for cache management according to an embodiment.

Referring to FIG. 3, the cache node 100 may include the cache management device 110 and the TTL controller 120. The cache node 100 may allocate a TTL value according to the popularity of the received content and determine the content to be stored in the cache storage 200. The popularity of the content may be the number of request messages for the content received by the cache node 100 during unit time. When a request for content is received, the cache management device 110 may manage the popularity of the content by updating the popularity of the corresponding content. The cache management device 110 may transmit information about the popularity of content determined in a previous time slot to the TTL controller 120 for every time slot.

The TTL controller 120 may determine the TTL value that can achieve a given optimization goal by performing the reinforcement learning based on information about the popularity of the content. The TTL controller 120 may determine the TTL values for each level of the popularity of the content. To calculate the TTL values for each popularity level for the content in a next time slot, the TTL controller 120 may receive information about the popularity of the content in the previous time slot from the cache management device 110, perform the reinforcement learning based on the information about the popularity of the received content, and determine the TTL values for each popularity level for the content in the next time slot based on a result of the reinforcement learning.

Thereafter, the cache management device 110 may receive the TTL value for each popularity level of the content of the next time slot from the TTL controller 120 and use the received TTL value for each popularity level to manage the contents in the cache storage 200 for the next time slot.

The cache management device 110 may measure a cache hit rate for contents in the current time slot and may transmit the measured cache hit rate to the TTL controller 120 when the current time slot ends. The cache hit rate for contents may be a ratio of the total number of request messages for the specific content and response(s) message transferred when the specific content is responded from the cache.

The TTL controller 120 according to the embodiment may perform the reinforcement learning to increase a given optimization goal by calculating a reward value using the cache hit rate received from the cache management device 110. Here, the optimization goal may be the sum of the utility (or effectiveness) of the cache hit rate for each content. The utility of the cache hit rate may be determined based on various functions and the functions for determining the utility of the cache hit rate may be determined according to the optimization goal of the application field. For example, to maximize the entire cache throughput, a linear function may be used as a function expressing the utility of each cache hit rate. Also, to maximize the proportional fairness for the content, a log function may be used as the function expressing the utility of each cache hit rate.

The cache management device 110 according to the embodiment may generate information about the popularity for each content and provide the generated popularity information to the TTL controller 120, and the TTL controller 120 may calculate the TTL value for each popularity level of the content based on the performance result of the reinforcement learning using the popularity information. That is, the TTL values for managing the cache storage life of the contents may be not individually assigned to all content, but may be determined according to the popularity level of the contents. For example, the TTL controller 120 may determine, based on the performance result of the reinforcement learning, a first TTL value corresponding to a first popularity level at which 0 to 999 requests are received per time slot and a second TTL value for a second popularity level at which 1000 to 1999 requests are received per time slot. Since the number of requests at the second popularity level is greater than that of the first popularity level, the second popularity level may be higher than the first popularity level and the second TTL value may be greater than the first TTL value.

Table 1 below shows the TTL table for each popularity level used by the cache management device 110 to manage the cache storage life of the contents.

TABLE 1

| Content Popularity Level | Each level of popularity range | TTL value ($TTL_k$) |
|---|---|---|
| $d_1$ | $[0, p_1)$ | 2 |
| $d_2$ | $[p_1, p_2]$ | 3 |
| ... | ... | ... |
| $d_{K-1}$ | $[p_{K-2}, p_{K-1})$ | 120 |
|  |  | 120 |
| $d_k$ | $[p_{K-1}, \infty)$ | 150 |
|  | $[p_{K-1}, \infty)$ | 150 |

The content popularity according to the embodiment may be managed in K popularity levels. The popularity range corresponding to each popularity level may be [the minimum value of the popularity included in the corresponding level, the maximum value of the popularity included in the corresponding level). For example, content having a popularity greater than or equal to $p_1$ and less than $p_2$ may correspond to the popularity level $d_2$. The cache management device 110 may determine the popularity level $d_k$ including the popularity $p_k$ ($1 \leq k \leq K$) in various ways. For example, the cache management device 110 may empirically measure the popularity maximum value $p_{max}$ and determine the K popularity levels by equally dividing the interval between 0 and $p_{max}$. Alternatively, the cache management device 110 may cluster the content into K groups according to the empirical popularity and determine the minimum value and the maximum value of the popularity of the contents included in each cluster as the popularity range of the cluster.

The cache management device 110 may update the TTL value of the popularity level with the TTL value for each popularity level received from the TTL controller 120 for every time slot. Then, the cache management device 110 may assign, to the new content, the TTL value of the popularity level to which the measured popularity value of the current time slot for new content belongs when the new content is received.

Figure 4:
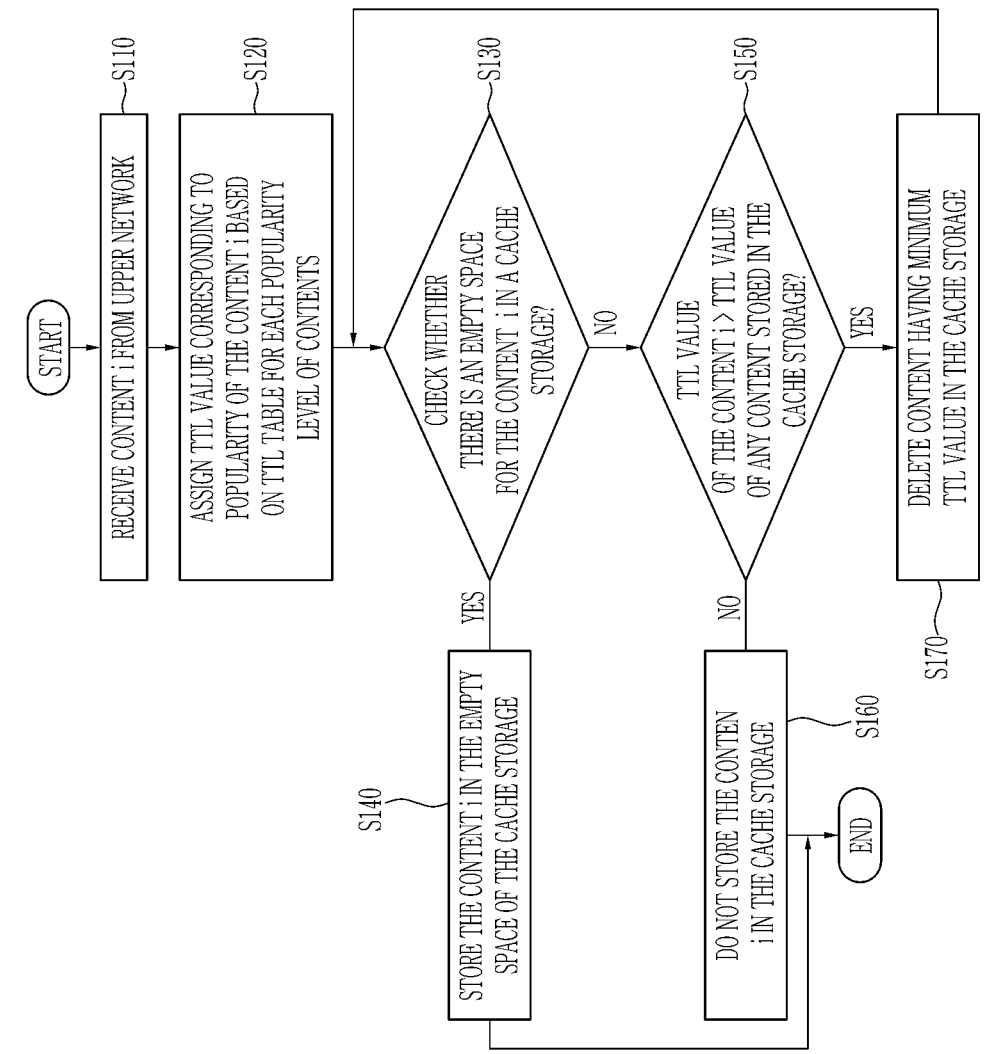
FIG. 4 is a flowchart illustrating a method for cache management by a cache management device according to an embodiment.

FIG. 4 is a flowchart illustrating a method for cache management by a cache management device according to an embodiment.

Referring to FIG. 4, when the cache node 100 receives content i from the upper network 20 (S110), the cache management device 110 may assign to the content i the TTL value of the popularity level to which the popularity of the content i belongs based on the TTL table for each popularity level (S120).

The cache management device 110 may check whether there is an empty space for the content i in the cache storage 200 (S130) and store the content i in the empty space in the cache storage 200 when there is an empty space in the cache storage 200 (S140).

However, if there is no empty space for the content i in the cache storage 200, the cache management device 110 may determine whether the content i can be stored in the cache storage 200 by comparing the TTL value of the content i with the TTL values of the contents (that is, TTL value of any content) stored in the cache storage 200 (S150). The current TTL values of the contents stored in the cache storage 200 may be calculated as follows.

Initial TTL value=a TTL value of the content when the content is stored in the cache storage Time of the storing=Time when the content is stored in the cache storage Current time=time when compared to the TTL value of the content i Current TTL value=Initial TTL value−(current time−storing time)

When the TTL value of the content i is less than or equal to the minimum TTL value among the TTL values of the contents in the cache storage 200, the cache management device 110 may not store the content i in the cache storage 200 and terminate cache storing management for the content i (S160).

However, when the TTL value of the content i is greater than the minimum TTL value among the TTL values of the contents in the cache storage 200, the cache management device 110 may delete the content having the minimum TTL value from the cache storage (S170) and perform again Step S130 described above by checking whether there is an empty space for the content i in the cache storage 200.

Figure 5:
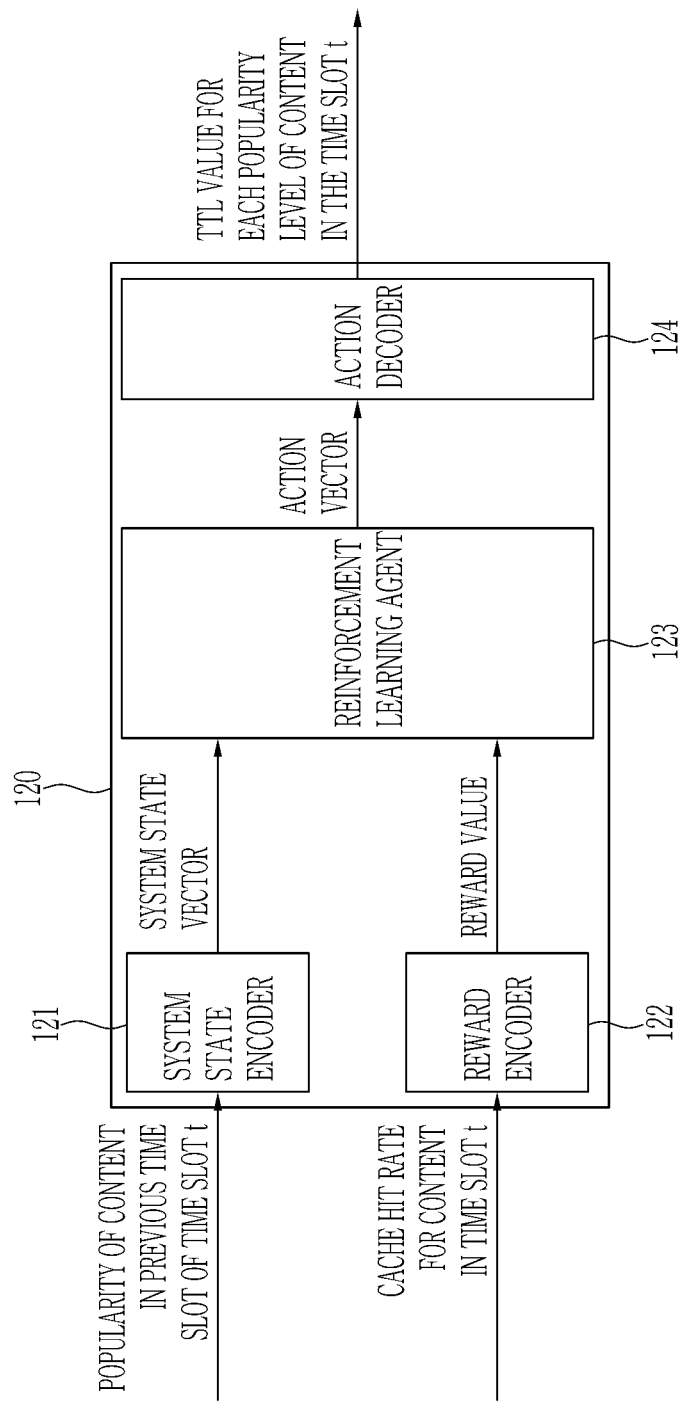
FIG. 5 is a block diagram illustrating a TTL controller according to an embodiment.

FIG. 5 is a block diagram illustrating a TTL controller according to an embodiment.

Referring to an embodiment, the TTL controller 120 may include a system state encoder 121, a reward encoder 122, a reinforcement learning agent 123, and an action decoder 124.

The system state encoder 121 may receive the popularity information for contents of the previous time slot of the time slot t from the cache management device 110, convert the received popularity information into a system state vector, and input the system state information (system state vector) to the reinforcement learning agent 123. The popularity information for contents received from the cache management device 110 may have a very large capacity according to the quantity of contents managed by the cache management device 110 and the quantity of content popularity information may change for every time slot. The system state encoder 121 may convert time-varying popularity information having a large capacity into the system state vector with a predetermined fixed size. Here, the system state vector may be a vector normalized to a value within a specific range.

At the end of the time slot, the reward encoder 122 may receive information about the cache hit rate of the content measured during the time slot from the cache management device 110 and calculate a reward value to achieve the given optimization goal based on the received information about the cache hit rate, and transmit the calculated reward value to the reinforcement learning agent 123. The reward value may be calculated by various methods according to the optimization goal.

The reinforcement learning agent 123 may receive the system state vector indicating content popularity and output an action vector corresponding to the received system state vector. In addition, the reinforcement learning agent 123 may update the internal learning model of the reinforcement learning agent 123 based on the reward value calculated from the cache hit rate. The reinforcement learning agent 123 may use various reinforcement learning machine learning models such as artificial neural networks.

The action decoder 124 may use the action vector output by the reinforcement learning agent 123 to calculate the TTL value for each popularity level to be applied during the next time slot and transmit the calculated TTL value for each popularity level to the cache management device 110.

Figure 6:
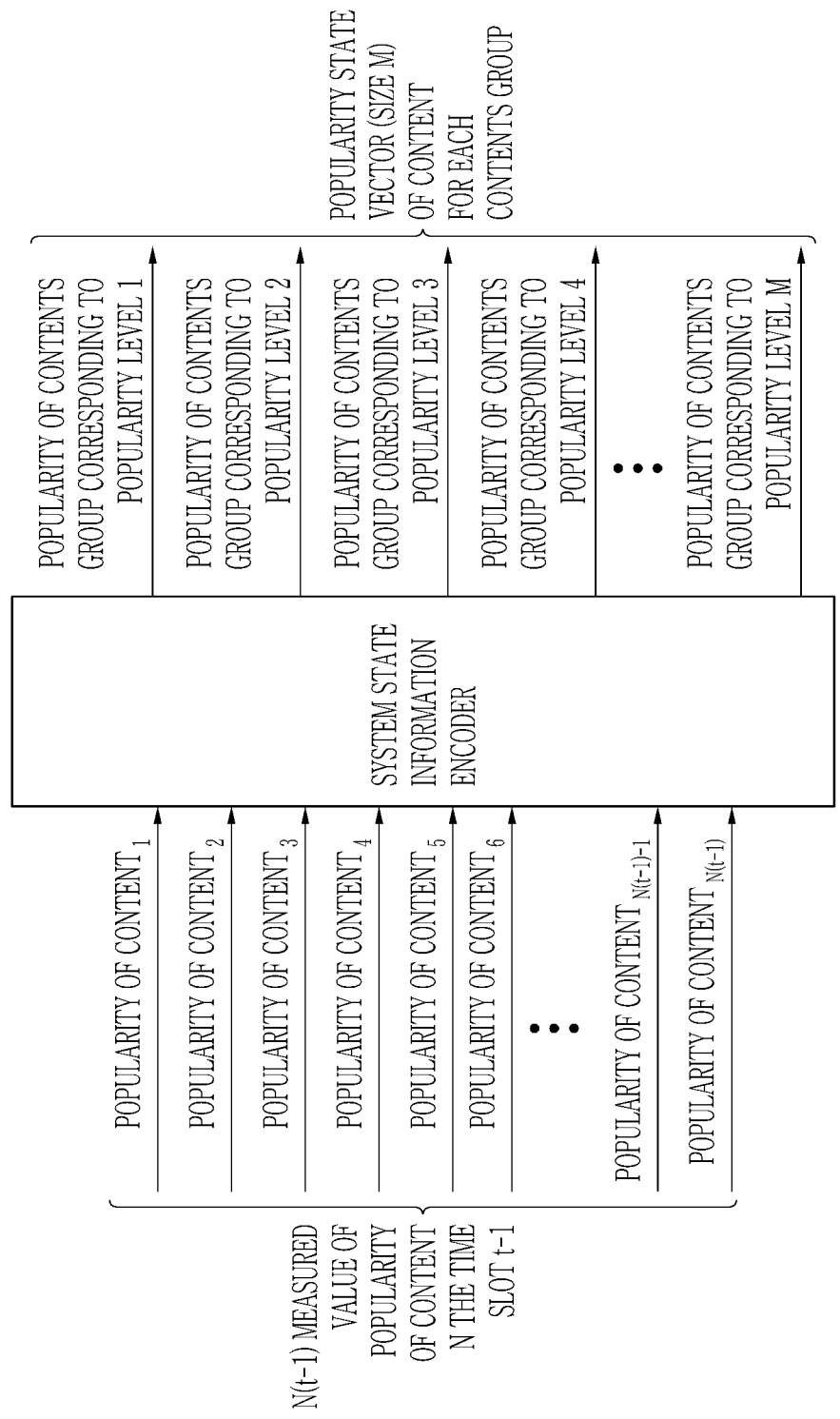
FIG. 6 is a schematic diagram illustrating a system state encoder of the TTL controller according to an embodiment.

FIG. 6 is a schematic diagram illustrating a system state encoder of the TTL controller according to an embodiment.

Referring to FIG. 6, the system state encoder 121 may sum the popularities of the contents measured during the previous time slot for each M content group according to the sizes of the content popularities. The number N(t−1) of the popularities of contents received from the cache management device 110 may be much greater than the number M of content groups. That is, the system state encoder 121 may process a certain number of popularity information for each content group from large-scale variable content popularity information and provide the processed popularity information as an input to the reinforcement learning agent 123.

Figure 7:
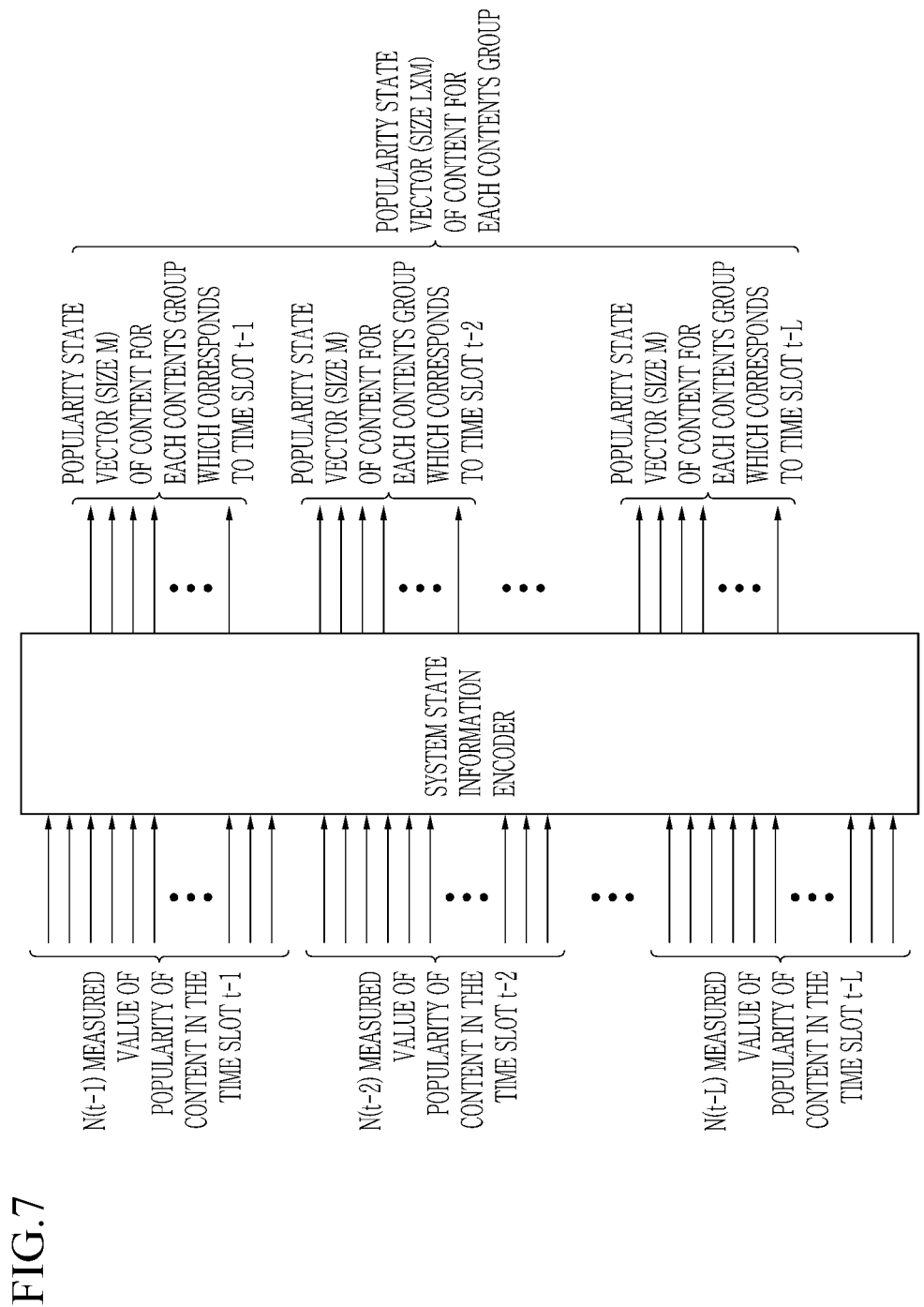
FIG. 7 is a schematic diagram illustrating a system state encoder of the TTL controller according to another embodiment.

FIG. 7 is a schematic diagram illustrating the system state encoder of the TTL controller according to another embodiment.

Referring to FIG. 7, the system state encoder 121 may receive the popularity value measured during the previous L time slots from the cache management device 110 and sum the received content popularity for each time slot for each M content group according to the size of the content popularity. The number of requests for content collected during the previous L time slots may vary for every time slot and the number of requests for content collected for each time slot may be very large. However, the system state encoder 121 may always and constantly provide L×M popularity information for each content groups for L time slots as an input to the reinforcement learning agent 123.

Figure 8:
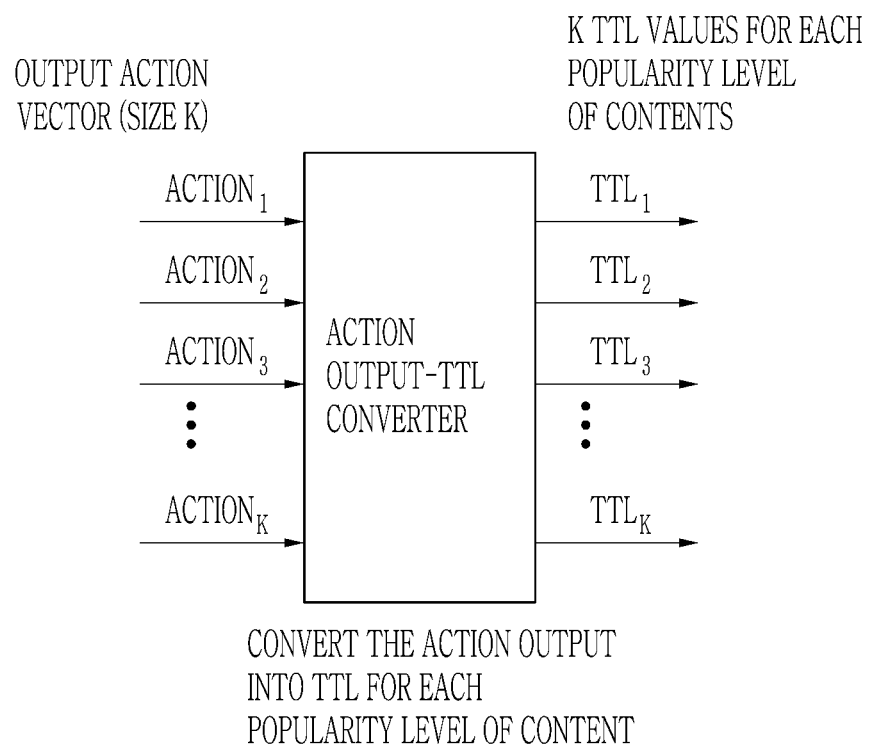
FIG. 8 is a schematic diagram illustrating an action decoder of the TTL controller according to an embodiment.

FIG. 8 is a schematic diagram illustrating an action decoder of the TTL controller according to an embodiment.

Referring to FIG. 8, the action decoder 124 according to an embodiment may output K TTL values for each popularity level based on the action vector having the size K received from the reinforcement learning agent 123. The TTL value ($TTL_k$) for each popularity level may be calculated as follows by the action output-TTL converter from the corresponding action output ($Action_k$).

TTL_MIN: possible minimum TTL value for content

TTL_RANGE: possible maximum TTL value for content−possible minimum TTL value for content ACTION_RANGE: maximum value of possible action output−minimum value of possible action output $Action_{low}$: Minimum value of possible action output $TTL_k$=TTL_MIN+($Action_k$−$Action_{low}$)×TTL_RANGE/ACTION_RANGE FIG. 9 is a schematic diagram illustrating the action decoder of the TTL controller according to another embodiment.

Figure 9:
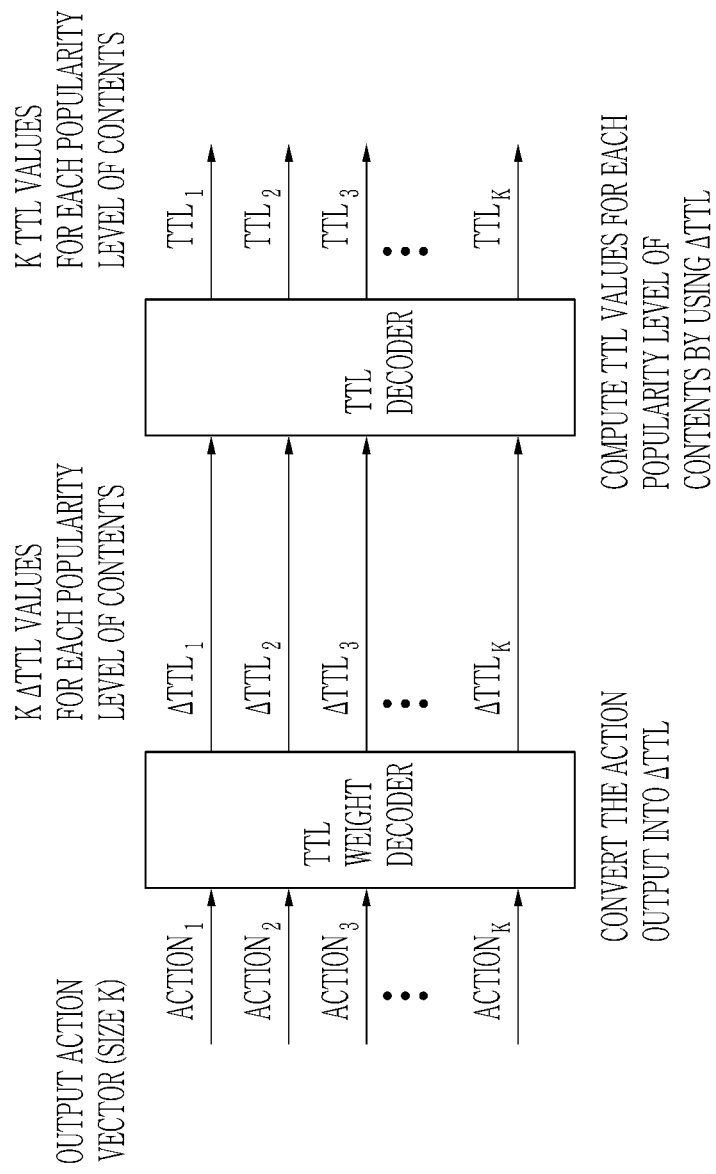
FIG. 9 is a schematic diagram illustrating an action decoder of the TTL controller according to another embodiment.

Referring to FIG. 9, the action decoder 124 according to another embodiment may include a TTL weight value decoder and a TTL decoder. The TTL weight value decoder may output TTL weight value $\Delta TTL_k$ (1≤k≤K) for each popularity level from the action output. The TTL decoder may determine the TTL value from the TTL weight value for each popularity level. The TTL weight value decoder may generate K TTL weight values for each popularity level from the action vector having the size K received from the reinforcement learning agent 123. The TTL weight value ($\Delta TTL_k$) for each popularity level may be calculated as follows from each corresponding action output ($Action_k$).

TTL_MIN: possible minimum TTL value for content
TTL_RANGE: possible maximum TTL value for content−possible minimum TTL value for content
ACTION_RANGE: maximum value of possible action output−minimum value of possible action output
$Action_{low}$: Minimum value of possible action output
$\Delta TTL_k = TTL\_MIN + (Action_k - Action_{low}) \times TTL\_RANGE / ACTION\_RANGE$ The TTL decoder may generate K TTL values for each popularity level from the K TTL weight values for each popularity level calculated by the TTL weight value decoder. The TTL value $TTL_k$ ($1 \leq k \leq K$) for each popularity level may be expressed as Equation 1 below.

$$TTL_k = \Sigma_{i=1}^{k} \Delta TTL_i \qquad \text{(Equation 1)}$$

Figure 10:
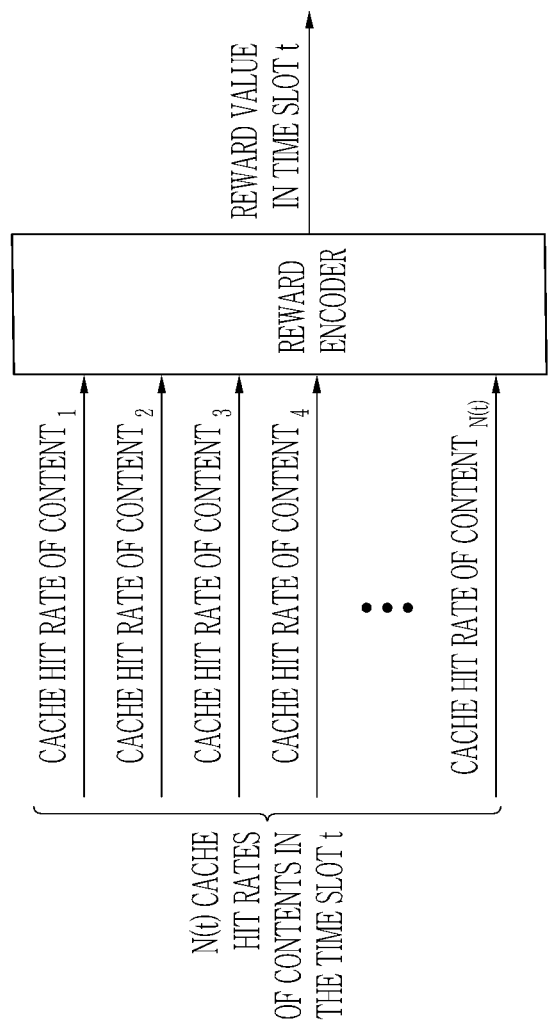
FIG. 10 is a schematic diagram illustrating a reward encoder of the TTL controller according to an embodiment.

FIG. 10 is a schematic diagram illustrating a reward encoder of the TTL controller according to an embodiment.

The reward encoder 122 according to an embodiment may receive the measurement result of the cache hit rate for all content requested during the current time slot from the cache management device 110. A value obtained by dividing the number of times that the cache node 100 immediately responds to a content request received during one time slot by the number of entire requests for the corresponding content may be determined as the cache hit rate. The TTL controller 120 according to the embodiment may perform the reinforcement learning with an optimization goal of maximizing the sum of the utility of the average cache hit rate for each content.

The effectiveness of the cache hit rate $h_i$ for the content i may be expressed as a utility function $U_i(h_i)$ for a given cache hit rate. The utility function may be selected from concave functions according to the optimization goal. The reward encoder may calculate the reward value as in Equation 2 below.

$$\text{Reward Value} = \Sigma_{i=1}^{N(t)} U_i(h_i(t)) \qquad \text{(Equation 2)}$$

The reward encoder 122 may transmit the calculated reward value to the reinforcement learning agent 123 as a reward value for the current time slot. Thereafter, the reinforcement learning agent 123 may update the machine learning model using the reward value input from the reward encoder 122.

As described above, the cache management device can efficiently manage the cache for storing content based on the reinforcement learning result performed by the TTL controller. The cache management device may assign the TTL value for each content to achieve the given optimization goal when using a TTL-based caching policy. That is, the TTL-based cache management device may learn the dynamic change in the popularity of the content through the reinforcement learning and determine the TTL value for each popularity level of the content based on the learning result, so that the caches can be managed to achieve given optimization goals in the dynamic environment where the required characteristics for the contents change spatially and temporally. Therefore, the cache management device according to the embodiment can effectively manage the cache even in an environment in which there is a lot of content managed by the cache node or the content request changes over time.

Figure 11:
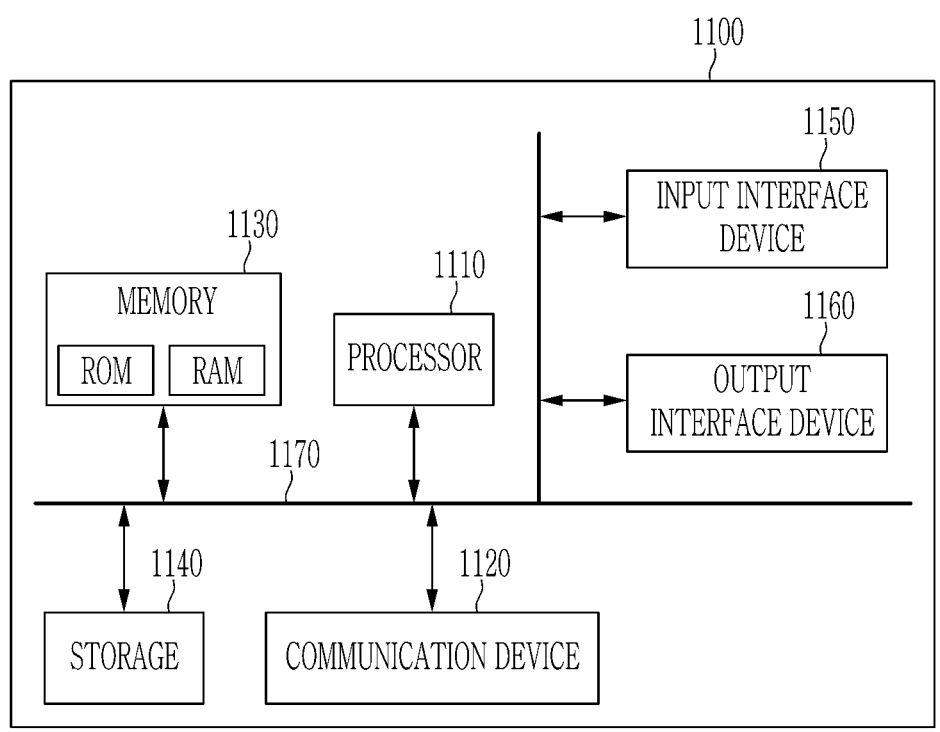
FIG. 11 is a block diagram illustrating a cache management device according to an embodiment.

FIG. 11 is a block diagram illustrating a cache management device according to an embodiment.

The cache management apparatus according to an embodiment, a computer system, for example, may be implemented as a computer-readable medium. Referring to FIG. 11, the computer system 1100 may include at least one of a processor 1110, a memory 1120, an input interface device 1150, an output interface device 1160, and a storage device 1140 communicating through a bus 1170. The computer system 1100 may also include a communication device 1120 coupled to the network. The processor 1110 may be a central processing unit (CPU) or a semiconductor device that executes instructions stored in the memory 1130 or the storage device 1140. The memory 1130 and the storage device 1140 may include various forms of volatile or nonvolatile storage media. For example, the memory may include a read only memory (ROM) or a random-access memory (RAM).

In the embodiment of the present disclosure, the memory may be located inside or outside the processor, and the memory may be coupled to the processor through various means already known. The memory is a volatile or nonvolatile storage medium of various types, for example, the memory may include a read-only memory (ROM) or a random-access memory (RAM).

Accordingly, the embodiment may be implemented as a method implemented in the computer, or as a non-transitory computer-readable medium in which computer executable instructions are stored. In an embodiment, when executed by a processor, the computer-readable instruction may perform the method according to at least one aspect of the present disclosure.

The communication device 1120 may transmit or receive a wired signal or a wireless signal.

On the contrary, the embodiments are not implemented only by the apparatuses and/or methods described so far, but may be implemented through a program realizing the function corresponding to the configuration of the embodiment of the present disclosure or a recording medium on which the program is recorded. Such an embodiment can be easily implemented by those skilled in the art from the description of the embodiments described above. Specifically, methods (e.g., network management methods, data transmission methods, transmission schedule generation methods, etc.) according to embodiments of the present disclosure may be implemented in the form of program instructions that may be executed through various computer means, and be recorded in the computer-readable medium. The computer-readable medium may include program instructions, data files, data structures, and the like, alone or in combination. The program instructions to be recorded on the computer-readable medium may be those specially designed or constructed for the embodiments of the present disclosure or may be known and available to those of ordinary skill in the computer software arts. The computer-readable recording medium may include a hardware device configured to store and execute program instructions. For example, the computer-readable recording medium can be any type of storage media such as magnetic media like hard disks, floppy disks, and magnetic tapes, optical media like CD-ROMs, DVDs, magneto-optical media like floptical disks, and ROM, RAM, flash memory, and the like.

Program instructions may include machine language code such as those produced by a compiler, as well as high-level language code that may be executed by a computer via an interpreter, or the like.

The components described in the example embodiments may be implemented by hardware components including, for example, at least one digital signal processor (DSP), a processor, a controller, an application-specific integrated circuit (ASIC), a programmable logic element, such as an FPGA, other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software. The method according to example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers.

A computer program(s) may be written in any form of a programming language, including compiled or interpreted languages and may be deployed in any form including a stand-alone program or a module, a component, a subroutine, or other units suitable for use in a computing environment.

A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random-access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks.

Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium.

A processor and a memory may be supplemented by, or integrated into, a special purpose logic circuit. The processor may run an operating system 08 and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements.

For example, a processor device may include multiple processors or a processor and a controller. In addition, different processing configurations are possible, such as parallel processors. Also, non-transitory computer-readable media may be any available media that may be accessed by a computer, and may include both computer storage media and transmission media.

The present specification includes details of the number of specific implements, but it should be understood that the details do not limit any invention or what is claimable in the specification but rather describe features of the specific example embodiment.

Features described in the specification in the context of individual example embodiments may be implemented as a combination in a single example embodiment. In contrast, various features described in the specification in the context of a single example embodiment may be implemented in multiple example embodiments individually or in an appropriate sub-combination.

Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

While this disclosure has been described in connection with what is presently considered to be practical example embodiments, it is to be understood that this disclosure is not limited to the disclosed embodiments. On the contrary, it is intended to cover various modifications and equivalent arrangements included within the spirit and scope of the appended claims.

What is claimed is:

1. A method for managing a cache for storing content, the method comprising:
   determining popularity of the content based on content requests received during a current time slot for the content;
   transmitting information about the popularity of the content to a time-to-live (TTL) controller and receiving, from the TTL controller, TTL values for each popularity level determined by the TTL controller based on the information about the popularity; and
   managing the content based on the TTL values for each popularity level;
   wherein the TTL value of the content is determined by using a TTL table for each popularity level consisting of the TTL values for each popularity level.

2. The method of claim 1, wherein:
   the managing the content based on the TTL values for each popularity level includes:

determining whether to store the content in cache storage by comparing the TTL value of the content with TTL values of pre-stored contents in the cache storage.

3. The method of claim 2, wherein:
the determining whether to store the content in cache storage by comparing the TTL value of the content with TTL values of pre-stored contents in the cache storage includes
deleting content with a minimum TTL value from the cache storage and checking an empty space for the content in the cache storage, when the TTL value of the content is greater than the minimum TTL value among the TTL values of the pre-stored contents.

4. The method of claim 2, wherein:
the determining whether to store the content in cache storage by comparing the TTL value of the content with TTL values of pre-stored contents in the cache storage includes
terminating cache storage management for the content without storing the content in the cache storage when the TTL value of the content is equal to or less than a minimum TTL value among the TTL values of the pre-stored contents.

5. A TTL controller determining a time-to-live (TTL) value for managing contents stored in a cache, the TTL controller comprising:
a system state encoder configured to receive information about popularity of contents in a previous time slot and generate a system state vector based on the information about the popularity;
a reward encoder configured to receive cache hit rate for contents in a current time slot and generate a reward value based on the cache hit rate;
a reinforcement learning agent configured to perform reinforcement learning by receiving the system state vector and the reward value; and
an action decoder configured to output TTL values for each popularity level of the current time slot based on an action vector generated from a result of the reinforcement learning performed by the reinforcement learning agent.

6. The TTL controller of claim 5, wherein:
the reinforcement learning agent configured to further perform the reinforcement learning to increase a sum of utility of the cache hit rate, and
the cache hit rate is a ratio of a total number of request messages for a specific content and response messages transferred when the specific content is responded from the cache.

7. The TTL controller of claim 5, wherein:
the reinforcement learning agent configured to further perform the reinforcement learning to increase a sum of utility of the cache hit rate expressed by a linear function, and
the action decoder configured to further output TTL values for each popularity level that maximize cache throughput of the cache.

8. The TTL controller of claim 5, wherein:
the reinforcement learning agent configured to further perform the reinforcement learning to increase a sum of utility of the cache hit rate expressed by a log function, and
the action decoder configured to further output TTL values for each popularity level that maximize proportional fairness of the content.

9. The TTL controller of claim 5, wherein:
the action decoder configured to generate TTL weight values for each popularity level from an action vector received from the reinforcement learning agent and determine the TTL values for each popularity level as a sum of the TTL weight values for each popularity level.

10. The TTL controller of claim 5, wherein:
the system state encoder configured to sum popularities of the contents measured during the previous time slot for each M content group according to sizes of the popularities and generate popularity information for each content group as the system state vector.

11. An apparatus for cache management of a cache for storing contents, the apparatus comprising:
a processor, a memory, and a communication device, wherein the processor executes a program stored in the memory to perform:
determining popularity of the content based on content requests received through the communication device during a current time slot for the content;
transmitting information about the popularity of the content to a time-to-live (TTL) controller through the communication device and receiving, from the TTL controller through the communication device, TTL values for each popularity level determined by the TTL controller based on the information about the popularity; and
managing the content based on the TTL values for each popularity level,
wherein the TTL value of the content is determined by using a TTL table for each popularity level consisting of the TTL values for each popularity level.

* * * * *